US 8,014,155 B2

(12) United States Patent
Kanayama et al.

(10) Patent No.: US 8,014,155 B2
(45) Date of Patent: Sep. 6, 2011

(54) HOUSING STRUCTURE AND ELECTRONIC APPARATUS HAVING THE SAME

(75) Inventors: Masaki Kanayama, Kawasaki (JP); Mitsuhiko Kawami, Kawasaki (JP); Hisao Morooka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 637 days.

(21) Appl. No.: 11/707,261

(22) Filed: Feb. 16, 2007

(65) Prior Publication Data
US 2007/0184727 A1     Aug. 9, 2007

Related U.S. Application Data

(63) Continuation of application No. PCT/JP2004/011914, filed on Aug. 19, 2004.

(51) Int. Cl.
*H05K 5/00*    (2006.01)
(52) U.S. Cl. ............... 361/752; 361/807; 361/810
(58) Field of Classification Search .......... 361/753, 361/748, 749, 758, 679.01, 728, 730, 752, 361/760, 783, 796, 799, 800, 807, 810, 816, 361/818; 439/736; 174/50, 520, 559, 560, 174/564
See application file for complete search history.

(56) References Cited

U.S. PATENT DOCUMENTS

| | | | | |
|---|---|---|---|---|
| 4,937,709 A * | 6/1990 | Yanagi et al. | ................. | 362/618 |
| 5,139,439 A * | 8/1992 | Shie | ............... | 439/359 |
| 5,319,582 A * | 6/1994 | Ma | ............... | 345/169 |
| 5,477,129 A | 12/1995 | Myslinski | | |
| 5,761,030 A * | 6/1998 | Roscoe | ............... | 361/684 |
| 5,914,853 A * | 6/1999 | Motoe et al. | ............... | 361/679.27 |
| 6,166,722 A * | 12/2000 | Kawabe et al. | ............... | 345/169 |
| 6,225,559 B1 | 5/2001 | Hubner et al. | | |
| 6,262,883 B1 * | 7/2001 | Kim | ............... | 361/679.09 |
| 6,323,902 B1 * | 11/2001 | Ishikawa | ............... | 348/373 |
| 6,507,488 B1 | 1/2003 | Cipolla et al. | | |
| 6,728,559 B2 * | 4/2004 | Masaki | ............... | 455/575.5 |
| 7,245,497 B2 * | 7/2007 | Klein et al. | ............... | 361/752 |
| 7,274,563 B2 * | 9/2007 | Lin | ............... | 361/679.55 |
| 7,656,675 B2 * | 2/2010 | Kim et al. | ............... | 361/752 |
| 2003/0076652 A1 | 4/2003 | Ahn | | |
| 2003/0184961 A1 | 10/2003 | Ahn | | |
| 2004/0201577 A1 * | 10/2004 | Yamada | ............... | 345/173 |

FOREIGN PATENT DOCUMENTS

| | | |
|---|---|---|
| CN | 2519588 | 10/2002 |
| JP | 2001-5567 | 1/2001 |
| JP | 2001-134345 | 5/2001 |
| JP | 2002-26534 | 1/2002 |
| JP | 2003-527706 | 9/2003 |

OTHER PUBLICATIONS

German Patent Office Action issued in corresponding German Patent Application No. P108005DEPC/UMB.
Japanese Patent Office Action dated Dec. 22, 2009 and issued in corresponding Japanese Patent Application No. 2006-531125.
Office Action issued in corresponding Chinese Patent Application No. 200480043823.7 on May 30, 2008.

* cited by examiner

*Primary Examiner* — Hung S Bui
(74) *Attorney, Agent, or Firm* — Staas & Halsey LLP

(57) ABSTRACT

A housing accommodates a circuit board and an electronic component electrically connected to the circuit board, and is used for an electronic apparatus that includes the circuit board and the electronic component. The housing includes a cover that is made by extrusion molding of metal.

9 Claims, 5 Drawing Sheets

HOUSING STRUCTURE AND ELECTRONIC APPARATUS HAVING THE SAME

This application is a continuation based on International Patent Application No. PCT/JP2004/011914, filed on Aug. 19, 2004, which is hereby incorporated by reference herein in its entirety as if fully set forth herein.

BACKGROUND OF THE INVENTION

The present invention relates generally to an electronic apparatus, and more particularly to a housing structure of the electronic apparatus. The electronic apparatus conceptually covers a laptop or notebook-type personal computer ("PC"), a personal digital assistant ("PDA"), an electronic dictionary, electronic stationery, and a game machine. The present invention is suitable, for example, for a housing structure of a laptop PC.

The recent laptop PC has been increasingly required to improve the environmental performance, such as recyclability, disassembly easiness, in addition to simple miniaturization and highly functional performance. Therefore, the housing material of the laptop PC is required to have high recyclability and disassembly easiness through the smaller number of components and a simple structure. In addition, it is necessary to easily access a maintenance requiring component, i.e., not by completely disassembling the housing but by partially disassembling it.

A typical housing for the laptop PC is made by resin molding and secures a size precision for highly functional performance. The typical housing has a display section mounted with an LCD screen, and a body section to which the display section is foldably and unfoldably connected. The body section has a housing structure including a lower cover, an upper cover (or palm rest) screwed onto the lower cover, and a keyboard.

The body section screws, onto the lower cover, a circuit board mounted with a CPU and a chip set, and various drivers connected to the circuit board, such as a CD/DVD drive, a hard disc drive ("HDD"), and a floppy disc drive ("FDD"). The body section has a metal plate on the rear surfaces of the upper and lower covers for electromagnetic shield.

Prior art include, for example, Japanese Patent Applications, Publication Nos. 2001-5567 and 2000-26534.

The conventional laptop PC does not exhibit sufficient environmental performance.

Initially, resin has several disadvantages: Firstly, resin's energy efficiency is low during molding and recycling, and resin generates hazardous substances, such as dioxin during burning. Secondly, resin has low durability and is likely to crack or chip. Thirdly, resin has a low heat radiation characteristic, enclosing the heat in the housing and thermally damage the PC. Accordingly, use of a metallic material and press molding is proposed instead of resin molding, but causes deteriorated dimension accuracy, wastes a material, and increases the cost. The metallic molding consumes much energy during a production of a mold and during molding, and increases the cost. Fourthly, resin is so weak that it needs reinforcement with a rib, etc., making a shape complicated, and deteriorating the disassembly easiness and maintainability.

Next, the metal plate for electromagnetic shield increases the number of components.

Moreover, the screw assembly requires unscrewing of all screws, making the disassembly arduous and lowering the maintainability. For example, disadvantages occur, such as a complex structure and the increased number of components, because it is necessary to unscrew the lower cover from the circuit board or to provide an inspection hatch in order to maintain the circuit board or the electronic components on the board.

BRIEF SUMMARY OF THE INVENTION

Accordingly, it is an exemplary object to provide an electronic apparatus that has improved environmental performance and maintainability.

A housing according to one aspect of the present invention accommodates a circuit board and an electronic component electrically connected to the circuit board, is used for an electronic apparatus that includes the circuit board and the electronic component, and has a cover that is made by extrusion molding of metal. This housing has a metallic cover with an electromagnetic shielding effect, and can eliminate or reduce the conventional metal plate. Metal, such as aluminum, has high energy efficiency during recycling, and generates no hazardous substances during burning. Metal has also high abrasive resistance and durability. The extrusion molding cuts a production cost of a mold, and metal provides higher strength than resin, restraining the energy consumption during molding. Preferably, the housing is a combination of plural covers.

A housing according to another aspect of the present invention is used for an electronic apparatus that includes a display section that displays information and foldably connected to a body section that includes a circuit board and an electronic component, and includes a lower cover and an upper cover which constitute the body section and are made by extrusion molding of metal, and a hinge part that enables the display section to be folded over the body section, and includes a first hinge cover that is attached to the body section, includes a U-shaped holder, and is made by extrusion molding of the metal, a second hinge cover that holds the display section, has a U shape configured to be rotatable relative to the first hinge cover, and is made by extrusion molding of the metal, and a shaft that connects the holder of the first hinge cover to the second hinge cover. The display section may have a back cover made by extrusion molding of the metal. The lower and upper cover of the housing, and the back cover are made of metal and can provide an electromagnetic shielding effect, eliminating or reducing the conventional metal plate. Metal, such as aluminum, has high energy efficiency during recycling, and generates no hazardous substances during burning. Metal has also high abrasive resistance and durability. The extrusion molding cuts a production cost of a mold, and metal provides higher strength than resin, restraining the energy consumption during molding. In particular, the extrusion molding is preferable, because it can easily form a U-shaped hinge that does not shift the shaft.

A housing according to still another aspect of the present invention is used for an electronic apparatus that includes a circuit board, accommodates the circuit board, and includes a middle cover onto which the circuit board is fixed, and an upper cover and a lower cover that are independently detached from the middle cover, and accommodate the middle cover. According to this housing, the circuit board is fixed onto the middle cover instead of the lower cover. Therefore, once one of the lower and upper covers is detached, it is possible to access the CPU etc. on the circuit board rather than disassembling the entire housing. Since the lower and upper covers can be used as maintenance hatches, the maintainability improves.

A housing according to still another aspect of the present invention accommodates a circuit board, and is used for an electronic apparatus that includes the circuit board, and includes plural covers at least partially fixed through mating. The fixture means for fixing the plural covers includes mating instead of using only screws, reducing the number of components and improving the disassembly easiness.

The plural covers may include a middle cover on which the circuit board is fixed, a lower cover and an upper cover which accommodate the middle cover and are independently detached from the middle cover. According to this housing, the circuit board is fixed onto the middle cover instead of the lower cover. Therefore, once one of the lower and upper covers is detached, it is possible to access the CPU etc. on the circuit board rather than disassembling the entire housing. Since the lower and upper covers can be used as maintenance hatches, the maintainability improves. In that case, the lower cover may have a first convex, the middle cover may have a second convex, and a first concave mated with the first convex of the lower cover. In addition, the upper cover may have a second concave mated with the second convex of the middle cover.

The lower cover and the upper cover are preferably made by extrusion molding of aluminum, and the middle cover is made by resin molding. This housing has metallic upper and lower covers with an electromagnetic shielding effect, and can eliminate or reduce the conventional metal plate. Metal, such as aluminum, has high energy efficiency during recycling, and generates no hazardous substances during burning. Metal has also high abrasive resistance and durability. The extrusion molding cuts a production cost of a mold, and metal provides higher strength than resin, restraining the energy consumption during molding.

The electronic apparatus may include a display section that displays information, a body section that includes the housing, the display section being foldably connected to the body section, and a residue display that displays a residue of a battery of the electronic apparatus, the residue display being provided on a curved surface of the upper cover and viewable when the display section is folded over the body section. The extrusion molding facilitates a formation of such a curved shape.

An electronic apparatus, such as a laptop PC, which has the above housing constitute one aspect of the present invention.

Other objects and further features of the present invention will become readily apparent from the following description of the preferred embodiments with reference to accompanying drawings.

DETAILED DESCRIPTION OF THE PREFERRED EMBODIMENTS

Figure 1:
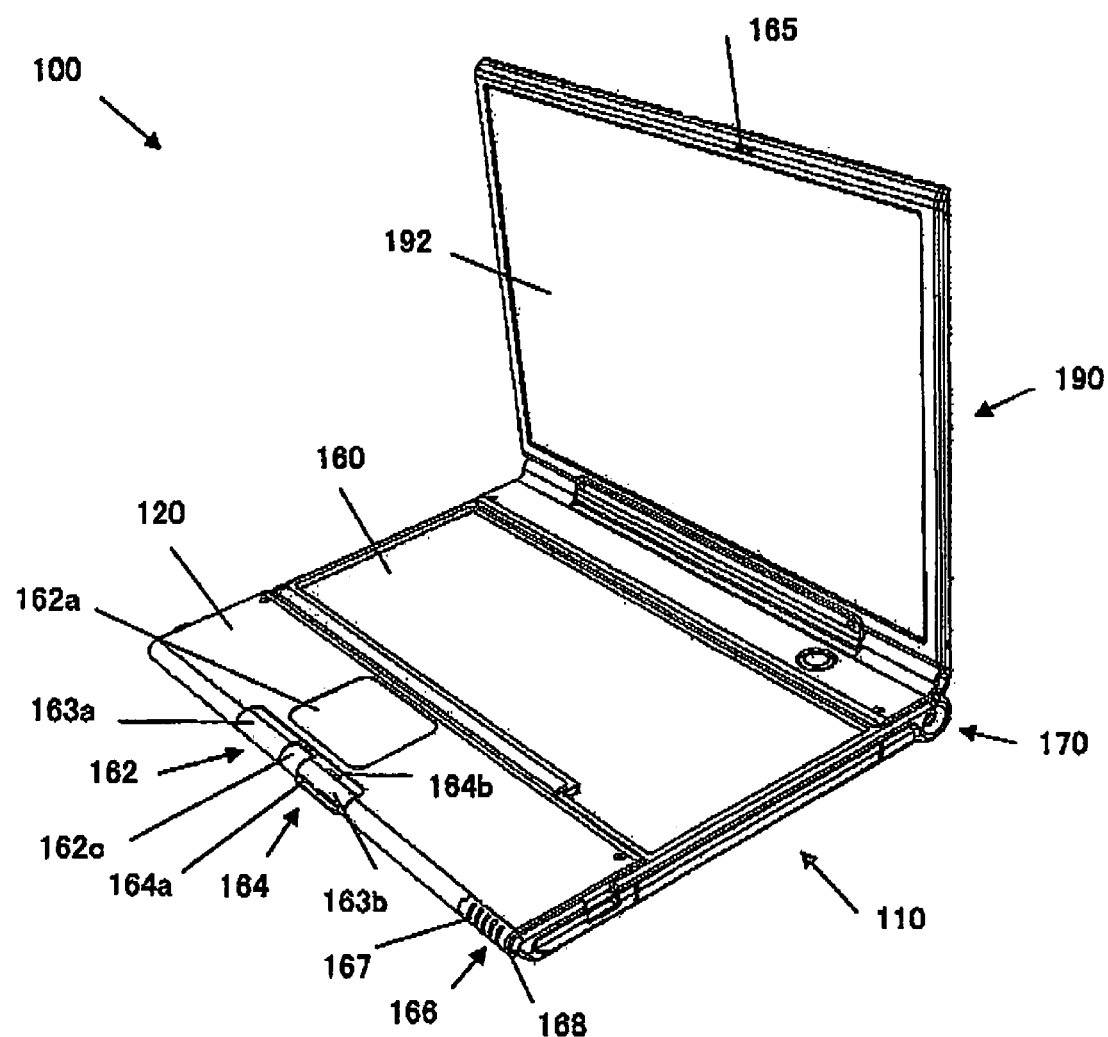
FIG. 1 is a perspective overview of an electronic apparatus (laptop PC) according to the present invention.
Figure 2:
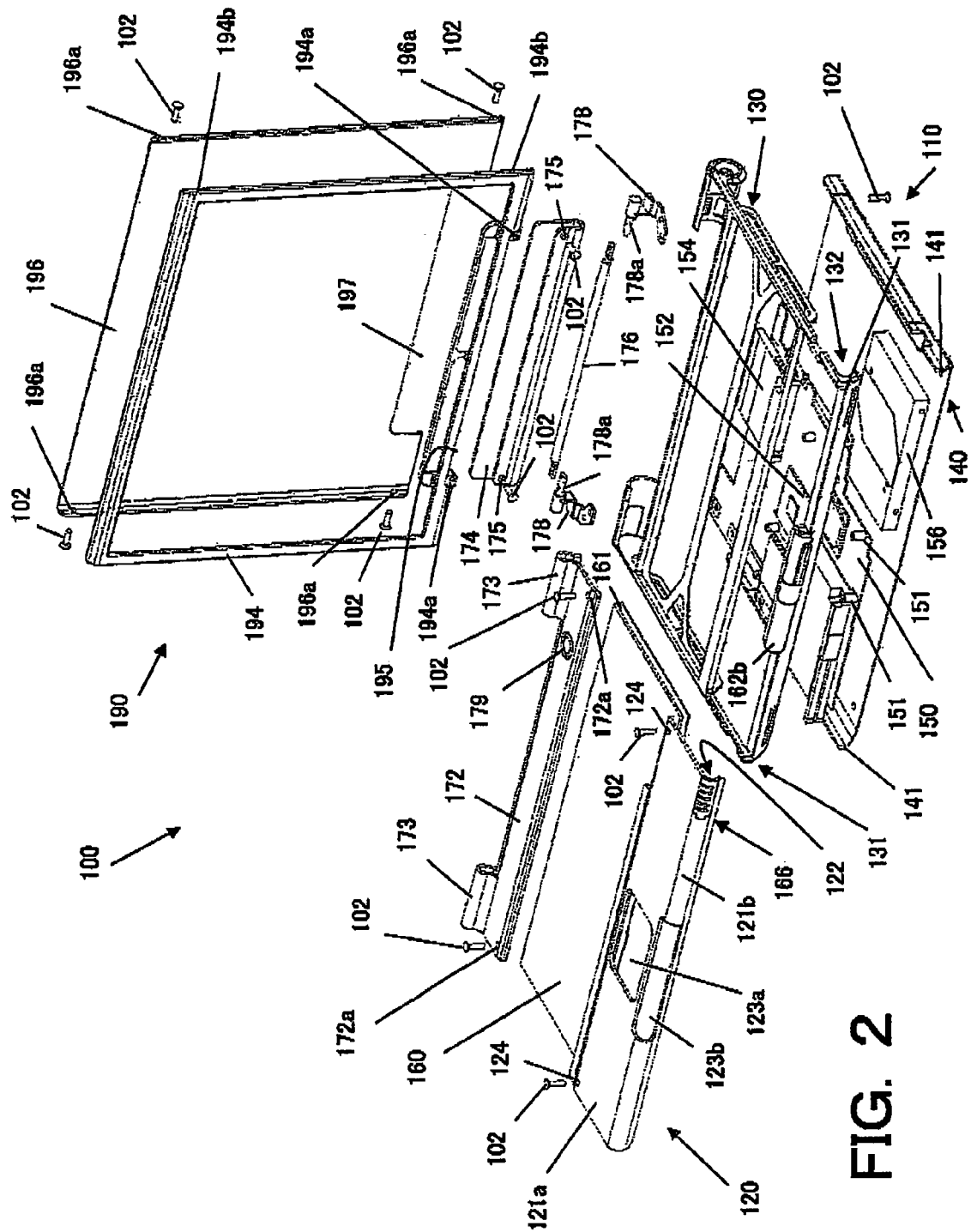
FIG. 2 is an exploded perspective view of the electronic apparatus shown in FIG. 1.

Referring to the accompanying drawings, a description will be given of an electronic apparatus 100 that is implemented as a laptop PC according to the present invention. Here, FIG. 1 is a perspective overview of the laptop PC 100. FIG. 2 is an exploded perspective view of the laptop PC 100. Referring to FIG. 1, the electronic apparatus 100 is exemplarily embodied, but not limited to, as a laptop PC 100, but is applicable to a portable electronic apparatus such as a PDA, handheld PC, palm-sized PC, wearable computer, an electronic dictionary, electronic stationery, a game machine, and a portable home appliance (e.g., a portable TV, a portable videocassette recorder, and a portable DVD). The size of the laptop PC 100 covers A4 size, B5 size, and other sub-note and mini-note size.

The laptop PC 100 includes a base (or a lower housing) 110 as a PC body section, a hinge part 170, and a liquid crystal display ("LCD") bezel frame (or an upper housing) 190.

The base 110 has a housing structure with a thickness, for example, of about 20 to 30 mm. The base 110 includes, as shown in FIG. 2, an upper cover 120, a middle cover 130, and a lower cover 140, and accommodates a circuit board 150 and a HDD 156. The base 110 has a keyboard 160 for information typing, a pointing device 162, a lock mechanism 164, and a battery residue display 166.

The upper cover 120 is a palm rest that is a region in front of the keyboard 160, and has no operating part for the palm or wrist to rest. The upper cover 120 maintains wrists horizontally, and mitigates fatigue and tenosynovitis due to the long-term typing. The upper cover 120 includes a top surface part 121a and a front edge part 121b. The top surface part 121a has a center rectangular hole 123a and a pair of screw holes 124. The front edge part 121b has a center attachment hole 123b. A screw 102 is inserted into each screw hole 124 to fix the upper cover 120 onto the middle cover 130.

The front edge part 121b has an inclined or curved surface, and the residue display 166 at the right end. The front edge part 121b enables a user to view the residue display 166 when the LCD bezel frame 190 is both folded over and unfolded from the base 110. In other words, the user can always view the residue display 160 with improved operability when the laptop PC 100 is operably placed on the desk. The back of the front edge part 121b has a concave 122 that is engageable with a convex 131 of the middle cover 130, as described later.

The upper cover 120 is made by extrusion molding of aluminum. Since the upper cover 120 is made of metal and exhibits an electromagnetic shielding effect, the conventional metal plate can be eliminated or reduced. Aluminum has high energy efficiency during recycling, and generates no hazardous substances during burning. Metal has also high abrasive resistance and durability. The extrusion molding cuts a production cost of a mold, and metal provides higher strength than resin, restraining the energy consumption during molding. In particular, the extrusion molding preferably maintains the curved shape of the front edge part 121b and the predetermined accuracy of the concave 122.

The middle cover 130 is molded with insulating resin, and the circuit board 150 and electronic components connected to it are fixed onto the middle cover 130. The middle cover 130 is a non-coated resin frame with no peel off of painting. The circuit board 150 is fixed onto the middle cover 130 instead of the lower cover 140 unlike the conventional structure. The conventional circuit board is fixed onto the lower cover, and connected to various electronic components. Therefore, a detachment of the lower cover results in their disconnections, and it is arduous to detach the lower cover from the housing and to open the rear surface of the housing. On the other hand, this embodiment does not fix the circuit board 150 onto the lower cover 140, and a detachment of the lower cover from the housing is easy to open the back surface of the housing. Thus, the maintenance operation becomes easy.

The middle cover 130 has a convex 131 and a concave 132 opposite to the convex 131. The convex 131 is engageable with the concave 122 of the upper cover 120. The concave 132 is engaged with a convex 141 of the lower cover 140. The middle cover 130 is mounted with the pointing device 162, which will be described later, and the lock mechanism 164.

The lower cover 140 is a sectionally U-shaped member that defines the bottom surface and the side surface of the body 110. The lower cover 140 has a pair of convexes 141 at both front side edges, and a pair of screw holes at both rear edges. The screw holes correspond to the screws 102 beneath the lower cover 140 in FIGS. 2 and 4, although their illustrations are omitted. When the screws 102 are inserted into the screw holes, the lower cover 140 is fixed onto the middle cover 130. The convexes 141 are engageable with the concave 132 of the middle cover 130. This embodiment mounts the HDD 156 on the middle cover 130.

The lower cover 140 is made by extrusion molding of aluminum. Since the lower cover 140 is made of metal and exhibits an electromagnetic shielding effect, the conventional metal plate can be eliminated or reduced. Aluminum has high energy efficiency during recycling, and generates no hazardous substances during burning. Metal has high abrasive resistance and durability. The extrusion molding reduces a production cost of a mold, and metal provides higher strength than resin, restraining the energy consumption during molding. In particular, the extrusion molding is preferable because it maintains the accuracy of each concave 141.

The laptop PC 100 accommodate the middle cover 130 mounted with the circuit board 150 between the upper cover 120 and the lower cover 140, and enables the upper cover 120 and the lower cover 140 to be independently detachable from the middle cover 130. As described above, the circuit board 150 is not fixed onto the lower cover 140 unlike the conventional structure. Thus, once one of the upper cover 120 and the lower cover 140 is detached, it is possible to access the CPU 152 on the circuit board 150, etc. and it is unnecessary to disassemble the entire housing. Thus, each of the upper cover 120 and the lower cover 140 can be used as a maintenance hatch, and the maintainability improves.

The circuit board 150 is mounted with the electronic components, such as the CPU 152 and the chip set 154, and screwed onto the middle cover 130 or engaged with grooves formed in the middle cover 130. 151 denote a screw hole. The screw hole 151 may be connected to a fixation between the circuit board 150 and the middle cover 130 or a fixation between the board 150 and the upper cover 120.

Types of the keyboard 160 may include 101, 106, 109 and ergonomics, and key arrangements include QWERTY, DVORAK, JIS, new-JIS, and NICOLA (Nihongo Nyuryoku Conthotium Layout). The keyboard 160 is located farther from the LCD bezel fame 190 than the conventional one by a predetermined distance. Since the keyboard 160 is spaced from an LCD screen 192 of the LCD bezel frame 190, the screen and the use's fingers are spaced from each other by that distance, and the keyboard operability improves. A metal plate 161 is provided under the keyboard 160, securing the electromagnetic shield effect.

The pointing device 162 emulates the mouse functions, and includes a touch pad 162a, a block 162b, and a roll-type scroll wheel 162c, although FIG. 2 omits the touch pad 162a.

The touch pad 162a exposes through the rectangular hole 123a in the top surface part 121a of the upper cover 120. The user moves his finger on the touch pad 162a, implementing a control function of moving a mouse cursor on the LCD screen 192. The block 162b defines left and right click buttons 163a and 163b that serve as mouse's left and right click buttons, and exposes through an attachment hole 123b in the front edge part 121b that extends from the top surface to the front surface of the upper cover 120. The roll-type scroll wheel 162c that serves as a mouse's scroll wheel is inserted between the left and right click buttons 163a and 163b, and improves the operability of the pointing device 162. A release button 164a of the lock mechanism 164 and a hook hole 164b are arranged on the right click button 163b.

The click buttons 163a and 163b project from the front edge part 121b, and reduces their areas on the top surface part 121a. The lock mechanism 164 is integrated with the click button 163a for space saving, and thus the keyboard 160 can be moved closer to the user apart from the LCD screen 192. As a result, the operability of the keyboard 160 improves. The scroll wheel 162c has a roller shape with a curved surface shape similar to the front edge part 121b of the upper cover 120.

The lock mechanism 164 provides opening and closing between the base 110 and the LCD bezel frame 190, and locks and unlocks the folded LCD bezel frame 190 over the base 110. The lock mechanism 164 includes the release button 164a and book hole 164b. The hook hole 164b is engageable with the hook-shaped engaging part 165 provided on the LCD bezel frame 190. As a result, the engaging part 165 is engaged with a hook (not shown) in the hook hole 164b. The release button 164a when pressed by the user releases an engagement between the engaging part 165 and the hook, enabling the engaging part 165 to be disengaged from the hook hole 164b.

The residue display 166 indicates the residue of the battery of the laptop PC 100, and includes a built-in secondary battery, a detector that detects the voltage and current of the battery, a controller, five LED lamps 167, and an operation button 168 integrated with the LED lamps 167. The controller calculates the residue of the battery based on a detection result by the detector when the operation button 168 is pressed, and turns on plural LED lamps 167 for a limited time period, the number of which corresponds to the residue. The residue display 166 uses plural LED lamps 167, and displays the residue by stages, enabling the user to recognize the residue at a glance. The residue display 160 turns on the LED lamps 167 for the limited time period for energy saving when necessary (or when the operation button 168 is pressed down) rather than normally turning on. The number of batteries may be plural.

The hinge part 170 includes hinge covers 172 and 174, a shaft 176, a pair of shaft holders 178. The hinge cover 172 is mounted with a power button 179, and has a pair of screw holes 172a. The hinge cover 174 has a pair of screw holes 175. The screw 102 is inserted into each screw hole 172a to fix the hinge cover 172 onto the middle cover 130. The screw 102 is inserted into each screw hole 175 to fix the hinge cover 174 onto the LCD bezel frame 190.

The hinge cover 172 spaces the keyboard 160 from the LCD screen 192, and improves the operability of the keyboard 160. The hinge cover 172 has a pair of U-shaped holders 173. The holder 173 has a narrow mouth and holds the shaft 176 while preventing a shift of the shaft 176. The hinge cover 174 has a U shape with a narrow mouth and holds the bottom of the shaft 176 and the LCD bezel frame 190.

The hinge covers 172 and 174 are made by extrusion molding of aluminum. Since the hinge cover 172 is made of metal and exhibits an electromagnetic shielding effect, the conventional metal plate can be eliminated or reduced. Aluminum has high energy efficiency during recycling, and generates no hazardous substances during burning. Metal has high abrasive resistance and durability. The extrusion molding reduces a production cost of a mold, and metal provides higher strength than resin, restraining the energy consumption during molding. In particular, the extrusion molding preferable because it can easily forms the U shape that prevents a shift of the shaft 176 of the hinge part 170. The hinge cover 174 is rotatably provided between the holders 173 of the hinge cover 172.

The shaft 176 connects the holders 173 to the hinge cover 174, maintaining a connection between them. The shaft 176 has a pair of supported parts 176a at its both ends. The shaft holder 178 holds the shaft 176 from its both sides so that the shaft 176 does not rotate. The shaft holders 178 are connected to the supported parts 176a of the shaft 176, and have support parts 178a arranged in the holders 173. The shaft holder 178 other than support part 178a is fixed onto the middle cover 130.

This embodiment provides the power button 179 on the right side on the top surface of the hinge cover 172, but this arrangement is merely illustrative. The laptop PC 100 maximizes the vacant space that is made by arranging the keyboard 160 closer to the front side.

The LCD bezel frame 190 has an LCD screen 192 that is omitted in FIGS. 2-5, a front cover 194 and a back cover 196 that sandwich the LCD screen 192, and possesses a substantially rectangular shape.

The front cover 194 is a frame made by resin molding, and connected to the hinge cover 174 at concave part 195 at the center bottom. A pair of screw holes 194a are formed at both sides of the concave 195. Moreover, the front cover 194 has a pair of screw holes 194b at both sides. Each screw hole 194a communicates with the screw hole 175, and receives the screw 102 to fix the hinge cover 174 onto the front cover 194. Each screw hole 194b communicates with a screw hole 196a of the back cover 196.

The back cover 196 has a sectional U shape that rises at both sides, and a pair of screw holes 196a at both sides. In addition, the back cover 196 is connected to the hinge cover 174 at concave part 197 provided on the center bottom.

The back cover 196 is made by extrusion molding of aluminum. Since the back cover 196 is made of metal and exhibits an electromagnetic shielding effect, the conventional metal plate can be eliminated or reduced. Aluminum has high energy efficiency during recycling, and generates no hazardous substances during burning. Metal has high abrasive resistance and durability. The extrusion molding reduces a production cost of a mold, and metal provides higher strength than resin, restraining the energy consumption during molding.

Figure 3:
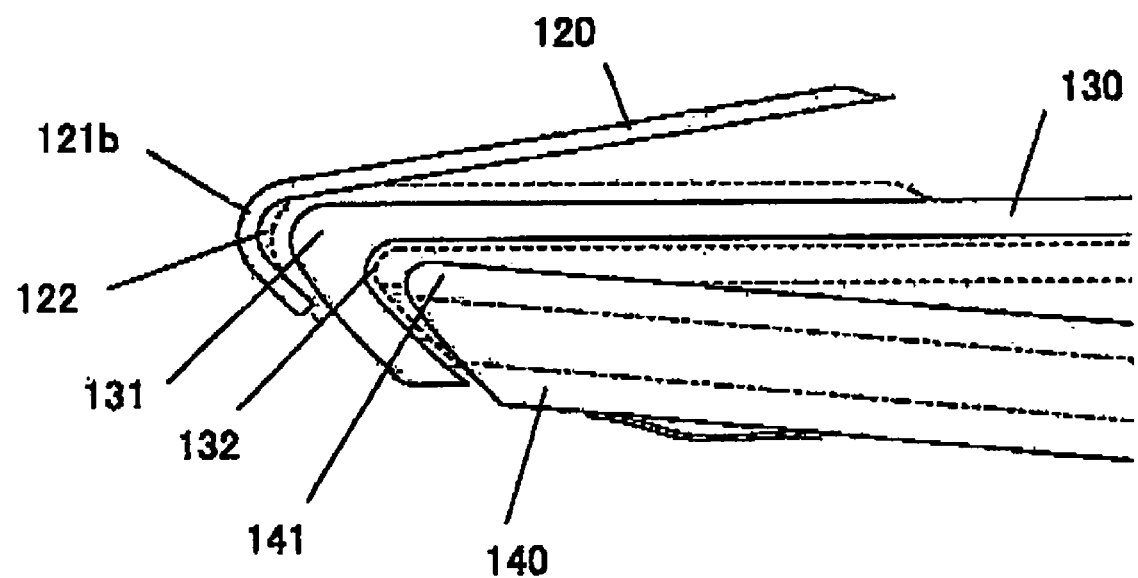
FIG. 3 is a partially exploded side view for explaining an assembly of the electronic apparatus shown in FIG. 1.
Figure 4:
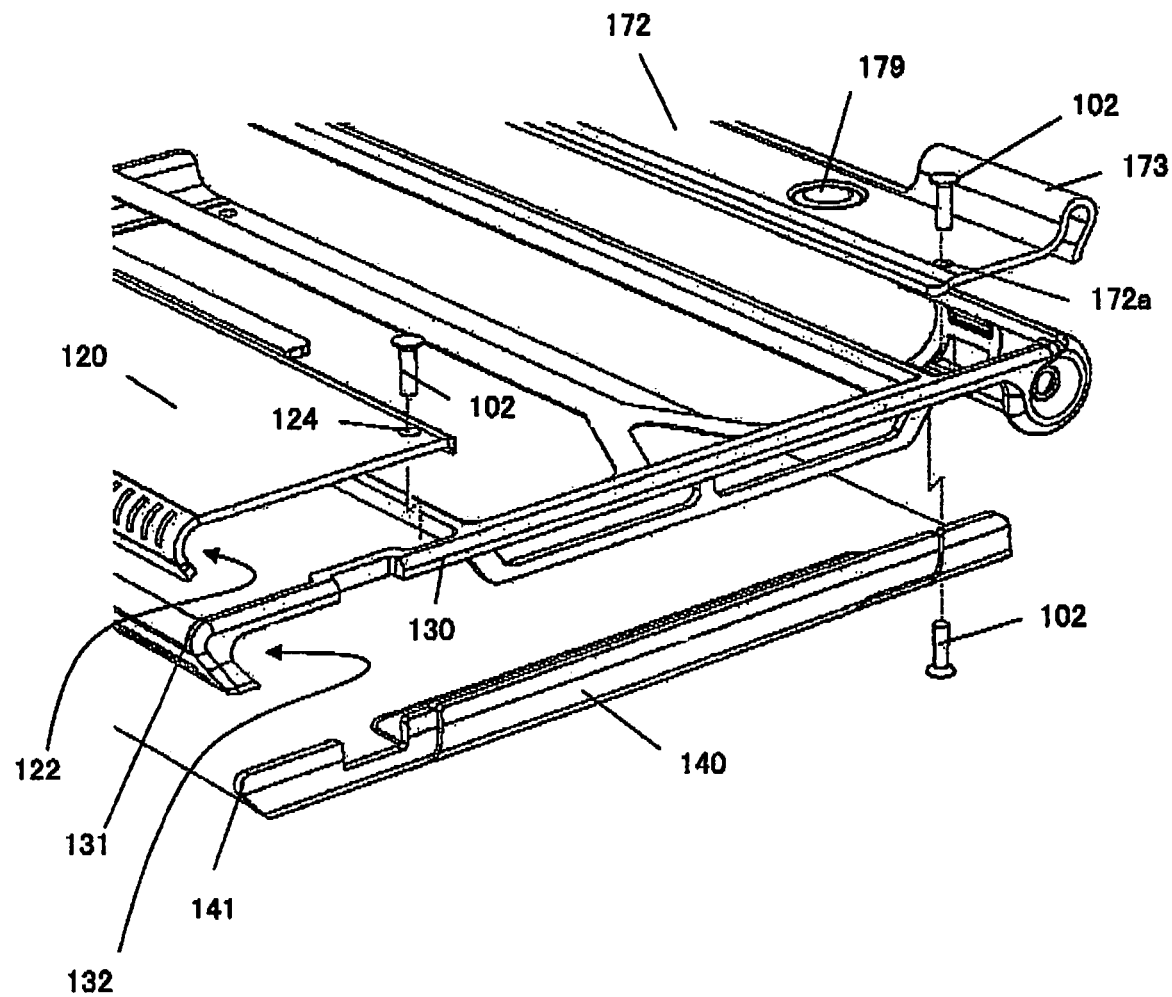
FIG. 4 is a partially enlarged, exploded perspective view for explaining the assembly of the electronic apparatus shown in FIG. 1.
Figure 5:
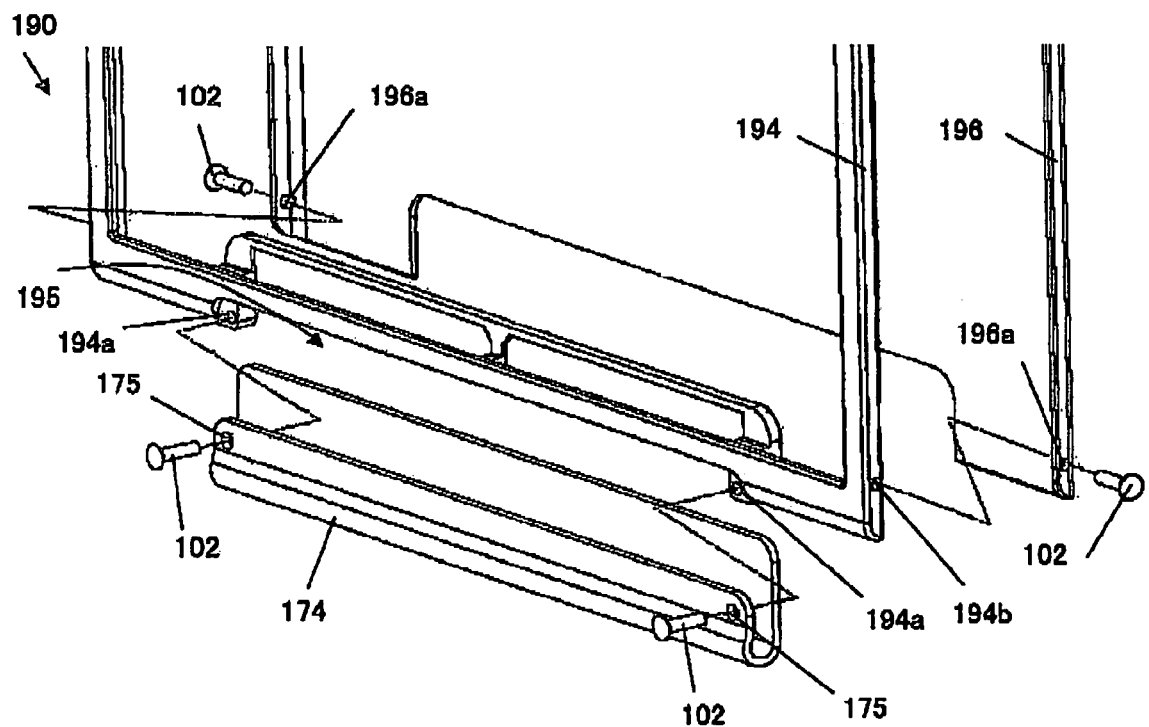
FIG. 5 is a partially enlarged, exploded perspective view for explaining the assembly of the electronic apparatus shown in FIG. 1.

Referring now to FIGS. 3 to 5, a description will be given of an assembly of the laptop PC 100. Here, FIGS. 3 and 4 are partially enlarged developed perspective view and enlarged side view for explaining the assembly of the PC body 110.

Initially, as shown in FIG. 3, the lower cover 140 is engaged with or hitched on the middle cover 130 so that the concave 132 of the middle cover 130 is mated with the convex 141 of the front edge of the lower cover 140. Similarly, the upper cover 120 is engaged with or hitched on the middle cover 130 so that the concave 122 of the upper cover 120 is mated with the convex 131 of the front edge of the middle cover 130. In FIG. 3, a solid line indicates a pre-engagement state, and a broken line indicates a post-engagement state. As a result, the front edge (at the front side when viewed from the user) is roughly fixed through mating.

Next, as shown in FIG. 4, the backside from the user is screwed. In other words, the screws 102 are inserted into the screw holes 124 to fix the upper cover 120 onto the middle cover 130. In addition, the screws 102 are inserted into the screw holes (not shown) in the rear edge of the lower cover 140 to fix the lower cover 140 onto the middle cover 130. Only screwing is the conventional fixture means for fixing the covers. Screws and screw holes should be prepared, posing problems of the increased number of components, complex structure, and restricted design freedom. On the other hand, this embodiment solves these problems and facilitates the disassembly by fixing the front edge (when viewed from the user) through mating or engagement.

In the LCD bezel frame 190, the front cover 194 and the back cover 196 are fixed through the screws 102 and the screw holes 194a and 196a. Next, the screws 102 are inserted into the screw holes 175 in the hinge cover 174 and the screw holes 194a to fix the hinge cover 174 mounted with the shaft 176 onto the front cover 194. Alternatively, after the hinge cover 174 and the front cover 194 are fixed, the shaft 176 may be arranged on the hinge cover 174. The shaft 176 is connected to the shaft holder 178 before or after that timing. Thereafter, the shaft 176 is caught on the holders 173 and the hinge cover 174 is arranged between the holders 173, thereby producing the housing of the laptop PC 100.

In operation, in the state shown in FIG. 1, the user inputs information from the keyboard 160 and the pointing device 162. As discussed above, the keyboard 160 has improved operability. The upper cover 120, the lower cover 140, the metal plate 161, and the binge cover 172 maintain the electromagnetic shield effect. Aluminum has a high heat radiation characteristic, lowering thermal damages of the electronic components. Moreover, the reduced weight of the metal plate for the electromagnetic shield makes the laptop PC 100 lightweight and improves the portability. Metal has higher strength and durability than resin, preventing cracks and chips of painting.

After the information input ends, the LCD bezel frame 190 is folded over the base 110. In this case, the lock mechanism 164 locks the LCD bezel frame 190 on the base 110. Then, if maintenances of the CPU 152, the chip set 154, etc. are necessary, the screws of the upper cover 120 or the lower cover 140 are detached so that the upper cover 120 or the lower cover 140 is detached from the middle cover 130 in order to access the object to be maintained. The unscrewed front edge facilitates the disassembly. Thus, the laptop PC 100 of this embodiment can use the upper and lower covers as maintenance hatches, improving the maintenance.

In using the laptop PC 100 again, the user presses the release button 164a and unlocks the LCD bezel frame 190 from the base 110. Thereby, the user can unfolds the LCD bezel frame 190 from the base 110. After the LCD bezel frame 190 is unfolded, the user presses the power button 179, and runs the operation system.

Thus, the laptop PC 100 of this embodiment forms most parts through extrusion molding, mounts internal components on the non-painted resin middle cover, and accommodates it between aluminum upper and lower covers. The upper and lower covers serve as maintenance hatches, improving the maintainability. The number of resin components remarkably reduces, and alternative aluminum has improved recyclability. In addition, aluminum has a shielding characteristic, and the number of components reduces. By utilizing a shape of an extrusion material, the covers are fixed through hitching and mating. As a result, the number of components, such as a screw, can be reduced. Aluminum has high abrasive resistance, durability, and heat radiation, and can maintain the strength and the operation stability. Since the extrusion molding eliminates a production of a mold, the cost can be reduced with improved energy efficiency during molding.

Further, the present invention is not limited to these preferred embodiments, and various variations and modifications may be made without departing from the scope of the present invention. For example, this embodiment fixes one end through mating and the other end through screws, but the present invention allows the other end to be fixed through mating. However, in this case, a structure that prevents a disengagement of the other end due to the impact is necessary.

The present invention can thus provide an electronic apparatus that has improved environmental performance and maintainability.

What is claimed is:

1. A housing that accommodates a circuit board, including a processor, mounted with an electronic component electrically connected to the circuit board, and is used for an electronic apparatus that includes the circuit board and the electronic component, said housing comprising:
   a body section that includes the circuit board and the electronic component;
   a display section configured to display information and is foldably connected to the body section; and
   a hinge part configured to enable the display section to be folded over the body section, wherein the body section includes:
   a lower cover and an upper cover that are made of metal; and
   a non-painted middle cover housed between the upper cover and the lower cover, the middle cover being made of resin and mounted with the circuit board, the lower cover, the non-painted middle cover, and the upper cover being piled in a thickness direction of the housing, wherein
   the circuit board mounted on the middle cover becomes exposed and accessible when one of the upper cover and the lower cover is detached from the housing.

2. The housing according to claim 1, wherein the hinge part includes:
   a first hinge cover that is attached to the body section, includes a U-shaped holder, and is made of metal;
   a second hinge cover that holds the display section, has a U shape configured to be rotatable relative to the first hinge cover, and is made by extrusion molding of the metal; and
   a shaft that connects the holder of the first hinge cover to the second hinge cover.

3. The housing according to claim 1, wherein the display section has a back cover made of metal.

4. The housing according to claim 1, wherein the metal is aluminum.

5. The housing according to claim 1, wherein the upper cover is engaged with the middle cover through mating and the middle cover is engaged with the lower cover through mating.

6. The housing according to claim 5, wherein the lower cover and the upper cover are independently detached from the middle cover.

7. The housing according to claim 6, wherein the lower cover and the upper cover are made of aluminum.

8. The housing according to claim 1, further comprising:
   a residue display configured to display a residue of a battery of the electronic apparatus, the residue display being provided on a curved surface of the upper cover and viewable when the display section is folded over the body section, the upper cover being engaged with the middle cover through mating at the curved surface of the upper cover.

9. An electronic apparatus comprising a circuit board, including a processor, mounted with an electronic component electrically connected to the circuit board, and a housing that accommodates the circuit board and the electronic component, said housing including a body section that includes the circuit board and the electronic component, a display section configured to display information and is foldably connected to the body section, and a hinge part configured to enable the display section to be folded over the body section, wherein the body section includes:
   a lower cover and an upper cover that are made of metal; and
   a non-painted middle cover housed between the upper cover and the lower cover, the middle cover being made of resin and mounted with the circuit board, the lower cover, the non-painted middle cover, and the upper cover being piled in a thickness direction of the housing, the circuit board being mounted on the middle cover so as to be exposed and accessible when one of the upper cover and the lower cover is detached from the housing.

* * * * *